United States Patent [19]

Polizzotto

[11] Patent Number: 4,485,267

[45] Date of Patent: Nov. 27, 1984

[54] SYSTEM FOR THE SUSPENSION OF THE CONDUCTORS OF A BUNDLE IN VERY HIGH VOLTAGE ELECTRIC LINES

[75] Inventor: Giovanni Polizzotto, Milan, Italy

[73] Assignee: Iselfa S.r.l., Italy

[21] Appl. No.: 435,546

[22] Filed: Oct. 21, 1982

[30] Foreign Application Priority Data

Oct. 21, 1981 [IT] Italy ................................ 24613 A/81

[51] Int. Cl.³ .......................... H02G 7/06; H02G 7/20
[52] U.S. Cl. ..................................................... 174/43
[58] Field of Search ..................... 174/40 R, 43, 45 R, 174/128 BL, 146, 149 R, 150

[56] References Cited

FOREIGN PATENT DOCUMENTS 185371  8/1966  U.S.S.R. ................................ 174/43

*Primary Examiner*—Laramie E. Askin
*Attorney, Agent, or Firm*—Stevens, Davis, Miller & Mosher

[57] ABSTRACT

The invention relates to a system for the suspension of the conductors of a bundle in very high voltage electric lines, for instance 1000 KV lines, wherein each suspension support consists of a steel tube, or of a pair of steel tubes, parallel to the longitudinal axis of the bundle of conductors, onto which there is fixed at least one set of radially disposed brackets, each for the support of one of the sub-conductors of the bundle, the insulating catenaries of suspension to the poles of the line being also directly anchored to said tube and passing through the bundle.

12 Claims, 8 Drawing Figures

SYSTEM FOR THE SUSPENSION OF THE CONDUCTORS OF A BUNDLE IN VERY HIGH VOLTAGE ELECTRIC LINES

BACKGROUND OF THE INVENTION

1. Field of the Invention

The present invention relates to high and very high voltage electric lines, for instance the most modern 1000 KV lines, and more specifically, to a system for the suspension of the conductors of said lines.

It is known that, in the lines of this type, conductors in a bundle are normally used, each bundle comprising a given number of sub-conductors—for instance six, eight, ten or even twelve sub-conductors—distributed over a circumference having a diameter of, for example, 900 to 1250 mm.

On account of the weight and size of such bundles of conductors, quite important problems have to be faced in connection with the system for the suspension thereof to the poles or standards of the line.

It should also be noted that, for lines of this type, use is preferably made—for each suspension point of the line—of a pair of struts, hinged at the base and connected at the top by an insulating chain or catenary, to which the conductors are hooked, said struts being also kept in position by tie rods or stays, anchored to the top of the poles and onto the the ground and mounted in opposition to the tractive force of the catenary.

2. Description of the Prior Art

Figure 1:
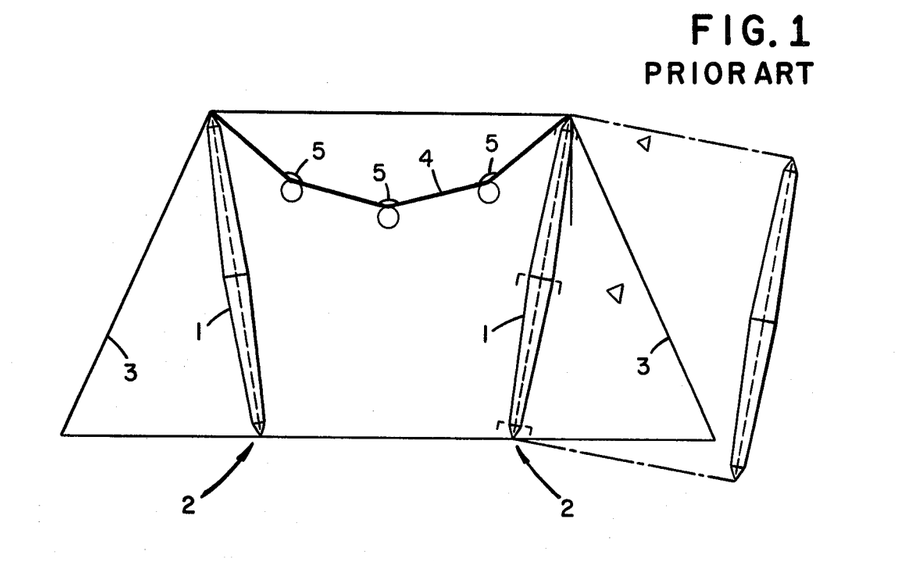
Figure 2:
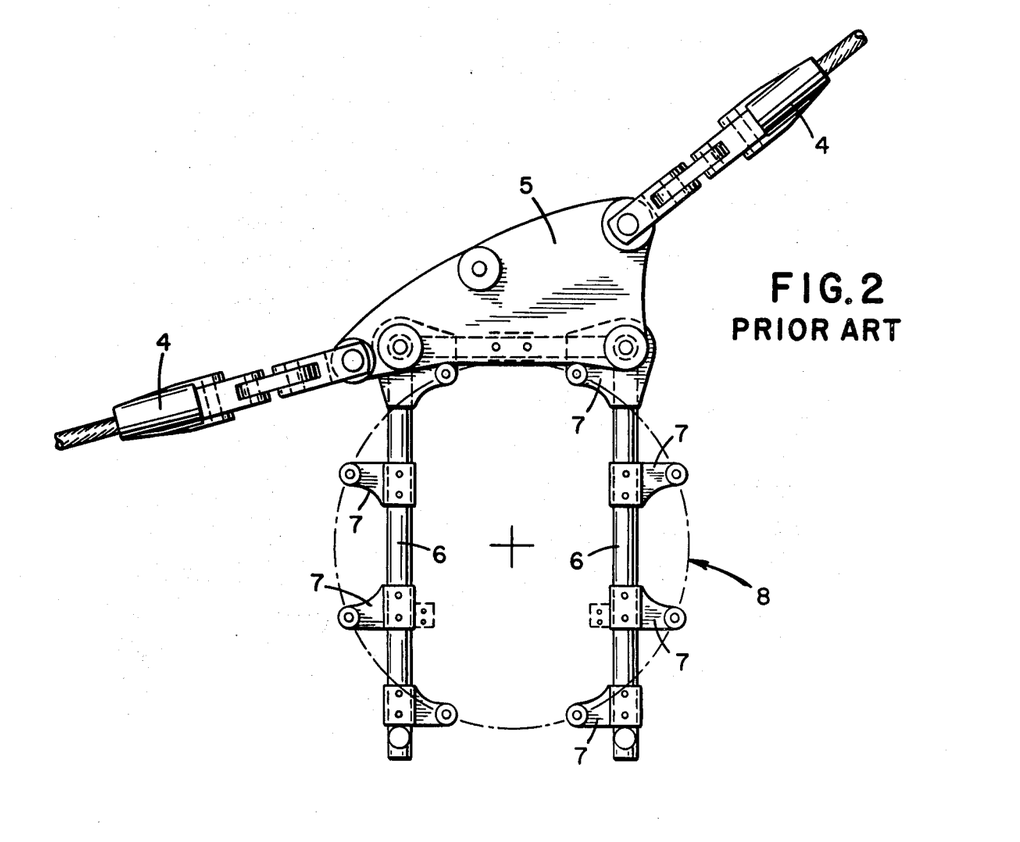

According to one of the known techniques, diagrammatically illustrated in FIGS. 1 and 2, a catenary 4 of mutual connection is arranged between the poles or standards 1, which are hinged onto the ground in 2 and kept in position by tie rods or stays 3. Said catenary has a broken-line course, determined by the fact that the conductors are hooked thereto in correspondence of the corner points. The straight sections of said catenary are constituted by one or more insulating catenaries, series and/or parallel connected, while a suitably configured suspension yoke 5 is provided in correspondence of each corner.

A yoke 5 is shown in FIG. 2 as having an asymmetric configuration, deriving from the fact that it is one of the yokes in a lateral position. The yoke provided in the central position obviously has a symmetrical configuration. In any case, to each yoke—which practically forms an element of the catenary—is suspended the true and proper support of the bundle of conductors.

According to one of the previously carried out embodiments, such a support is constituted by a pair of rods 6 hanging onto the yoke 5, rigidly mounted at a predetermined mutual distance and carrying in turn brackets 7, to which the single sub-conductors of the bundle are directly connected. The configuration of the brackets 7 and their positioning along the rods 6 are such that the suspension points of the single sub-conductors get to find themselves uniformly distributed over a circumference 8.

The main faults of such a suspension support lie in:

its general configuration, which is very bulky and has a very low barycenter in respect to the suspension point of the insulating catenary, which makes the whole system easily subject to the oscillations caused by the wind, or to high bankings in the corner positions of the line;

the scarce protection against glow discharge, which compels to provide for supplementary protection systems, between the insulating catenaries and the bundles of sub-conductors, against the electric glow discharge deriving from the very high voltage of the line;

the requirement, also in relation to what has just been said, of realizing various types of supports, differing one from the other, in order to adapt oneself to different points of connection and to the different positions which they take up along the line;

and, finally, the presence of single connection points, for instance in correspondence of the yoke 5 or of the rods 6, the accidental breaking of which could easily lead to a complete or partial collapse of the line.

SUMMARY OF THE INVENTION

The object of the present invention is to propose a support for the suspension of the conductors of a bundle, used in very high voltage electric lines, which is apt to eliminate the above drawbacks and which provides, in particular, a more compact structure, more steady in operation, more protected against electric glow discharge, safer because of the presence of several connection points, and finally lending itself to the production of few unified types.

This result is essentially obtained due to the fact that the said suspension support is formed by a central elongated core having its axis parallel to the longitudinal axis of the bundle of conductors, onto which core there is fixed at least one set of radially positioned brackets, each for the support of a sub-conductor of the bundle, the tie rods forming the insulating catenary being furthermore directly anchored onto said core.

Preferably, the various chains forming the insulating catenary are anchored onto points distributed along the extension of the central core, and two sets of radial brackets are fixed in correspondence of the two ends of said central core.

According to an interesting characteristic of the invention, said central core also comprises at least one highly resisting steel tube.

BRIEF DESCRIPTION OF THE DRAWINGS

Further characteristics and advantages of the suspension system according to the present invention will anyhow result more evident from the following description of some preferred embodiments thereof, illustrated by way of example in the accompanying drawings, in which:

FIGS. 1 and 2 refer to the known technique and they have already been described;

DESCRIPTION OF THE PREFERRED EMBODIMENTS

Figure 3:
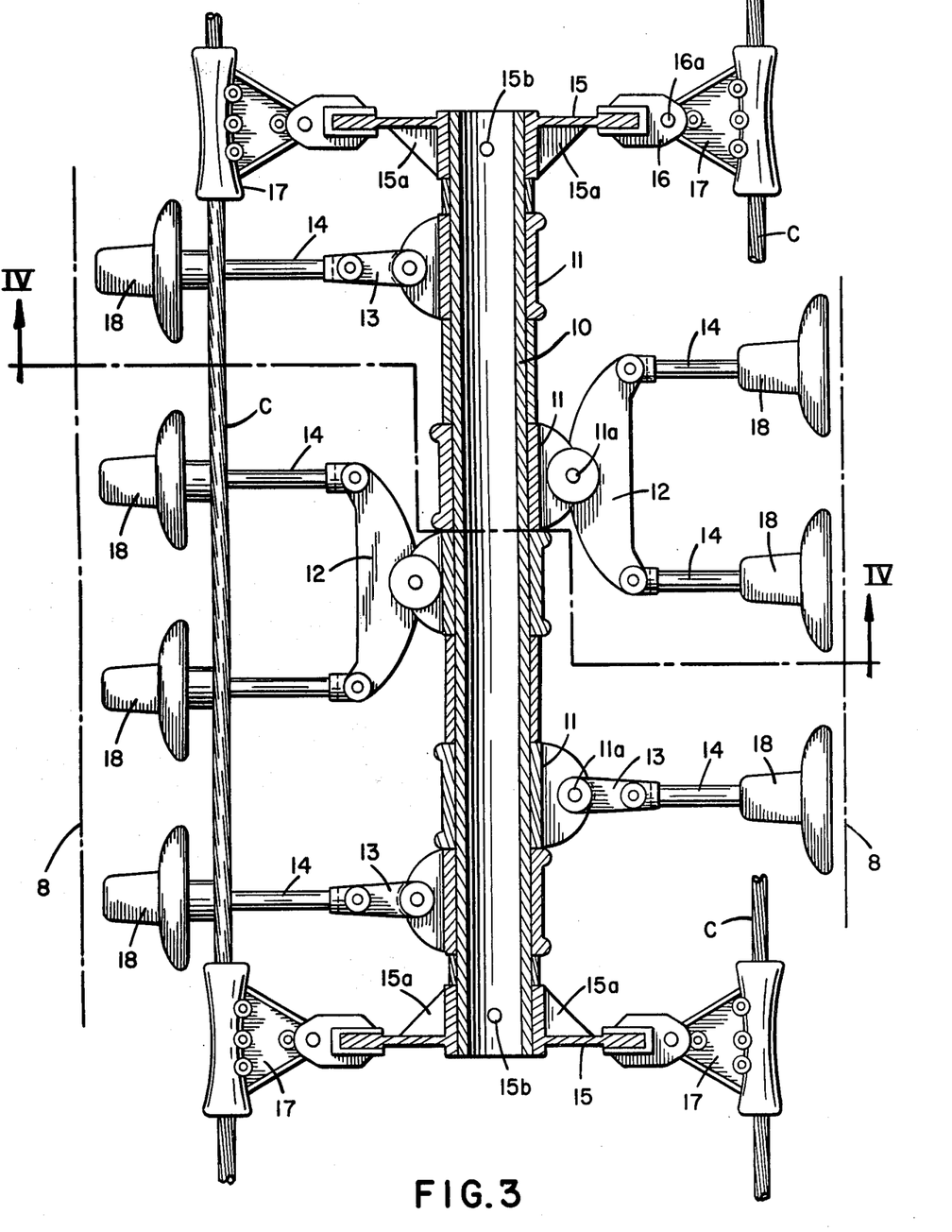
FIG. 3 is a partly sectioned diagrammatic plan view, with some parts removed to make the drawing more clear, of a first embodiment of the support according to the invention, comprising a central core in the form of a single steel tube.
Figure 4:
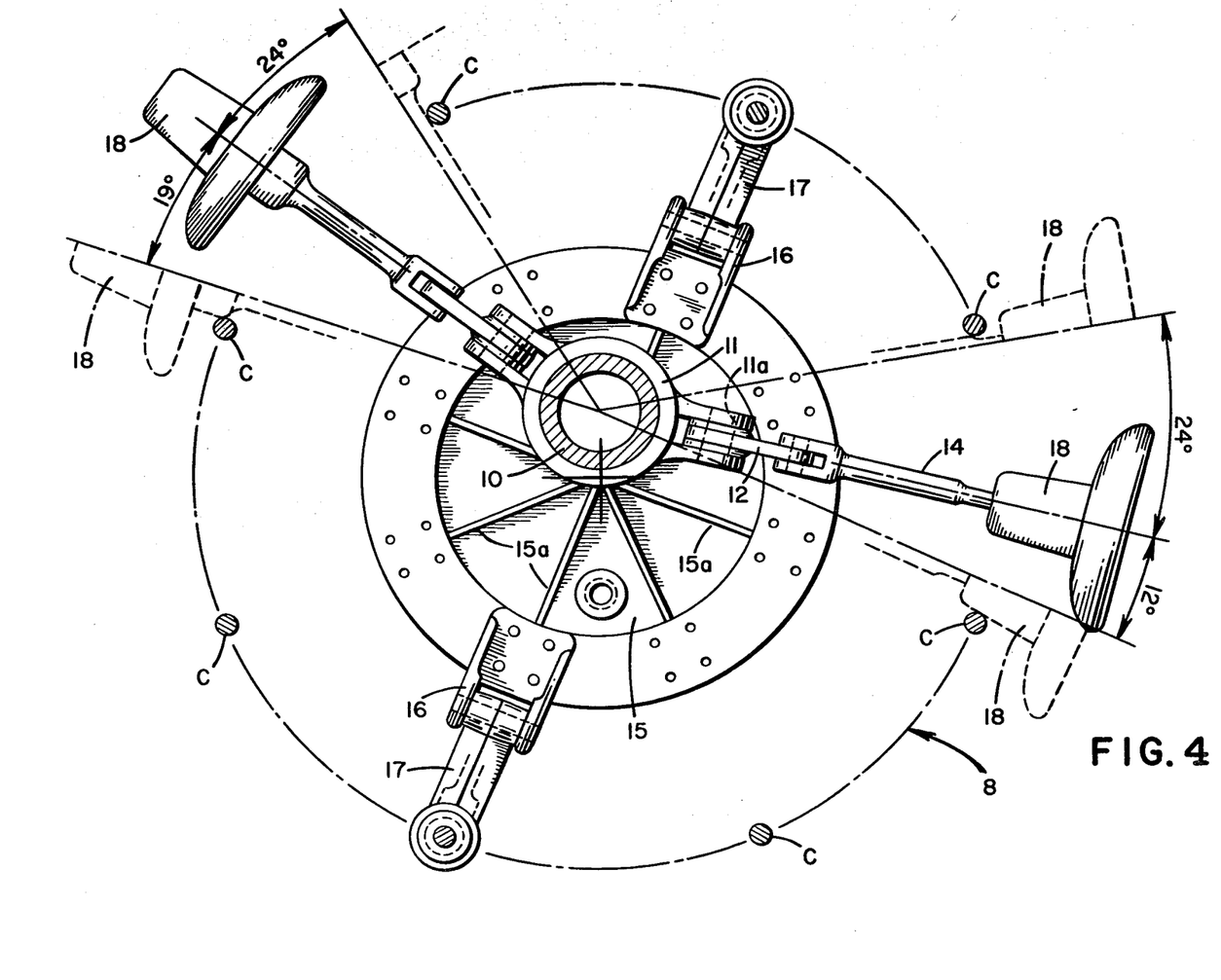
FIG. 4 is a diagrammatic cross-section view, with parts removed, along the line IV—IV of FIG. 3.

As shown in FIGS. 3 and 4, the suspension device for a bundle of conductors, according to the invention, comprises an elongated central core formed by a highly resisting steel tube 10.

Coupling sleeves 11 are inserted on said tube 10, each sleeve having a flange to which is connected—rotatable about a pin 11a perpendicular to the axis of the tube 10—a rocking lever 12, or a simple connecting rod 13, to which are also pivotally connected the bars 14 of the tie rods of the catenary 4.

Two disc plates 15, with stiffening ribs 15a, are furthermore mounted onto the opposite ends of the tube 10, brackets 16 for the support of clamps 17 holding the sub-conductors C being fixed at the periphery of said disc plates 15, evenly distributed around the periphery itself.

The clamps 17 are rotatably mounted on the brackets 16, through respective pins 16a perpendicular to the axis of the tube 10, so as to allow a limited possibility of longitudinal sliding of one of the sub-conductors in respect of the others.

In the case illustrated, eight brackets 16 and clamps 17 are provided at each end of the tube 10, evenly distributed on the periphery of each plate 15, to support the eight sub-conductors forming the bundle.

As shown in FIGS. 3 and 4, each tie rod of the catenary comprises known insulators 18—or chains of insulators—the first of which is in close proximity of the circumference 8 defined by the bundle of conductors C (see FIG. 4). The tie rod portion included between the first insulator 18 and the tube 10—i.e. essentially, the rocking levers 12, the connecting rods 13 and the bars 14—is therefore practically all contained inside the bundle.

Thus, one of the most interesting aspects of the suspension support according to the invention appears quite evident, and precisely that all the parts forming said support—including a part of the actual tie rods of the catenary—are contained inside the cylindrical volume defined by the circumference 8 passing along the axes of the sub-conductors of the bundle. Any problem of electric glow discharge is thereby substantially eliminated.

The suspension support shown in FIG. 4 is designed for one of the lateral positions of the catenary, as it appears evident from the positioning of the two tie rods which are directed, one upwards—i.e. towards the connection at the top of the pole 1 (left of the drawing)—and the other more downward, i.e. towards the central position of the catenary (right of the drawing). FIG. 3 shows moreover that, while towards the centre of the catenary (right of drawing) only three parallel tie rods are provided—since these only have to bear the weight of the central bundle—on the side towards the connection at the top of the pole 1 (left of drawing) four tie rods are provided, these last ones obviously having to bear both the weight of the lateral bundle and the weight of the central bundle.

The use of the connection rocking levers 12, in combination with the simple connecting rods 13, allows—according to an already known principle—to obtain an automatic balancing of the loads on the different catenaries, also in the event that one of these should accidentally break.

As shown in FIG. 3, the disc plates 15 are keyed onto the tube 10 by means of pins 15b, while the coupling sleeves 11 for the insulating catenaries are free to rotate on the tube 10. Whereby the tube 10, and the whole suspension support, are free to rotate when the bundle of conductors swings under the oscillations imparted by the wind: this therefore confers to the bundle a high rotational freedom about the axis of the tube 10, without this latter being subject to exceeding torsional stresses.

The oscillation amplitude allowed for the bundle of conductors, around the axis of the tube 10, is indicated (as shown in FIG. 4) as 19°+24° in respect of the left tie rod, and as 12°+24° in respect of the right tie rod.

On the other hand, the axis of the tube 10 does not coincide with the centre of the disc plate 15 and, consequently, it does not either coincide with the longitudinal axis of the bundle of conductors, but it finds itself positioned above these. In this way, in spite of the high degree of rotational freedom, the bundle of conductors always tends to return to its correct working position, thanks to its own weight, its barycenter being lower than the axis of the tube 10.

Figure 5:
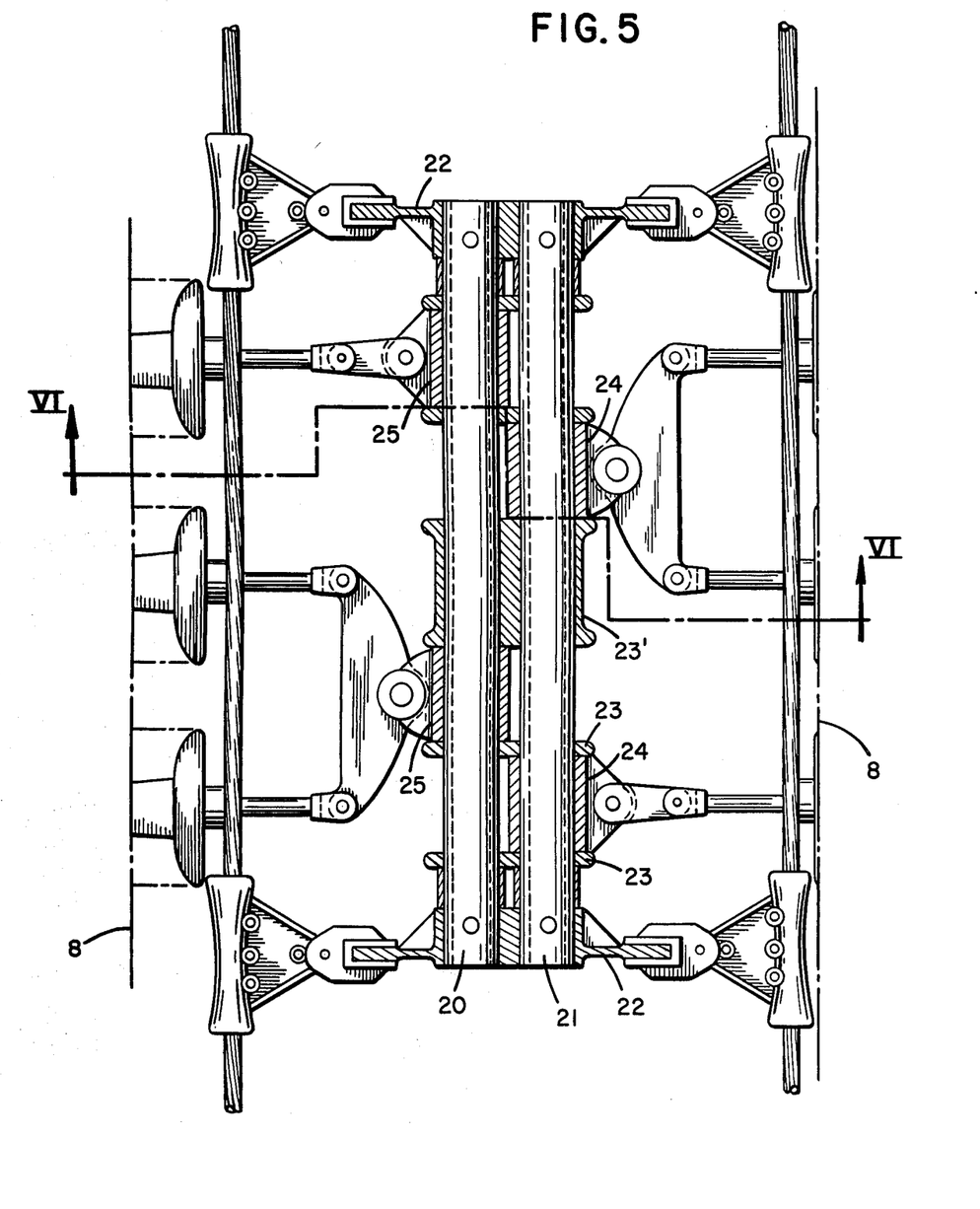
FIG. 5 is a view, fully similar to that of FIG. 3, showing a modified embodiment with the central core formed by a pair of parallel steel tubes, the support illustrated herein being designed for the central position of the suspension catenary.
Figure 6:
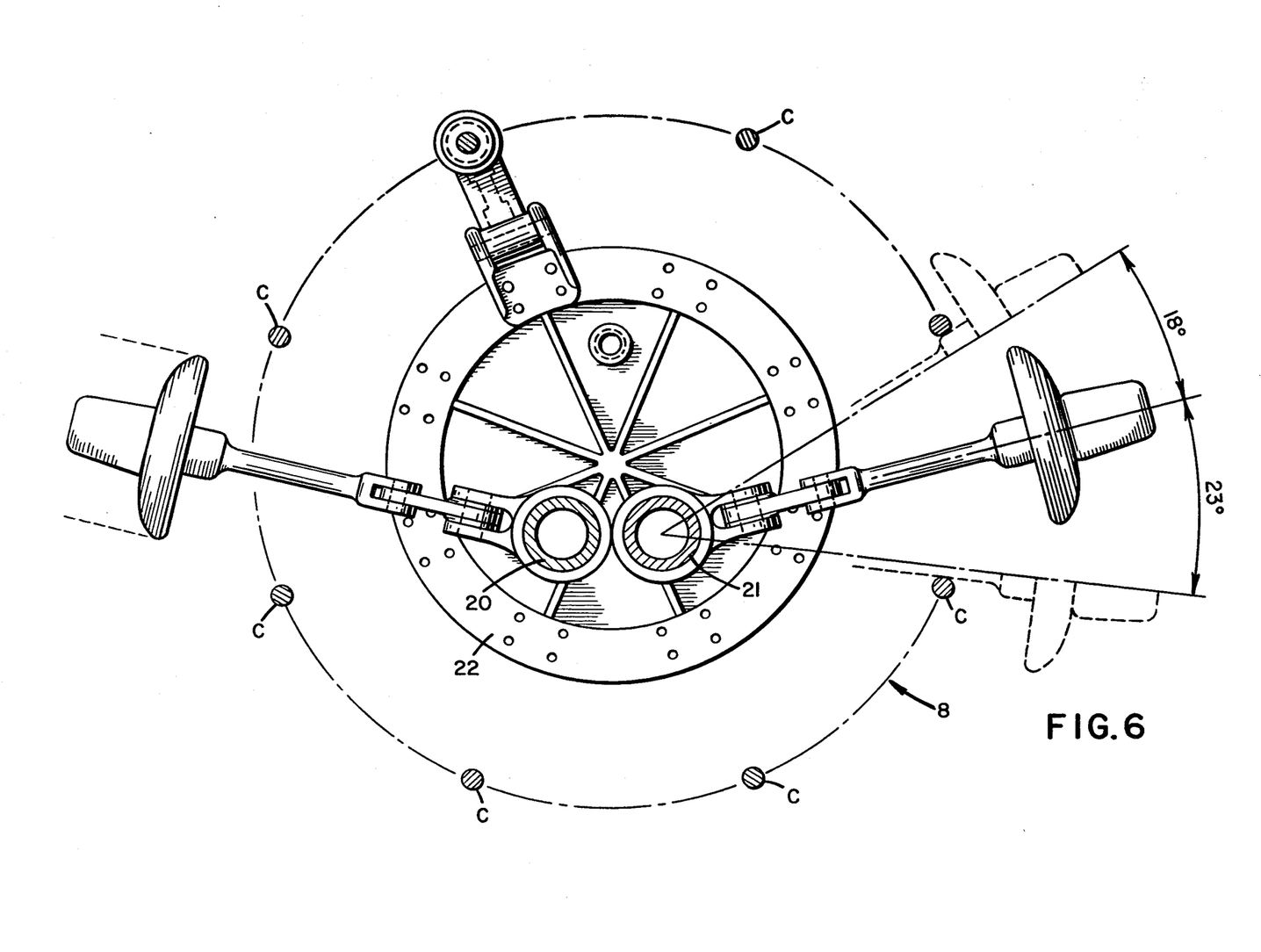
FIG. 6 is a section similar to that of FIG. 4, but along the line VI—VI of FIG. 5.

The modified embodiment shown in FIGS. 5 and 6 differs from that of FIGS. 3 and 4 due to the fact that the elongated central core is formed herein by a couple of parallel steel tubes 20 and 21. These tubes are mutually connected—as well as at the ends, by engagement in corresponding holes of the disc plates 22 (see also FIG. 6)—by transversal connection double-rings 23, possibly also in the form of spacers 23'.

As can be seen at once from FIGS. 5 and 6, on the right tube 21 (in respect of the drawing) are mounted the coupling sleeves 24 for connecting the catenaries coming from the right, while on the left tube 20 are mounted the coupling sleeves 25 for connecting the catenaries coming from the left.

As clearly shown in the drawing, the suspension support of FIGS. 5 and 6 is designed for the central position of the catenary 4, seeing that the tie rods depart therefrom with an upward symmetrically inclined configuration. It can also be seen that—as already said—three insulating catenaries are connected to the right of this central support, and three are connected to the left.

FIG. 6 shows moreover that the axes of the tubes 20 and 21 are positioned herein lower than the centre of the disc plates 22, i.e. lower than the barycenter of the bundle. This arrangement—taking also into account the separate connection of the catenaries on opposite sides onto the two tubes 20 and 21—allows to give a higher torsional stability to the bundle. The choice between the arrangement according to this embodiment and the arrangement of FIGS. 3 and 4 is obviously determined by planning.

Even if this embodiment allows to obtain a higher torsional strength of the bundle of conductors, as said, the oscillation amplitude provided remains sufficiently wide and it is indicated (as shown in FIG. 6) as 18°+23° both on the left and on the right of the bundle.

Figure 7:
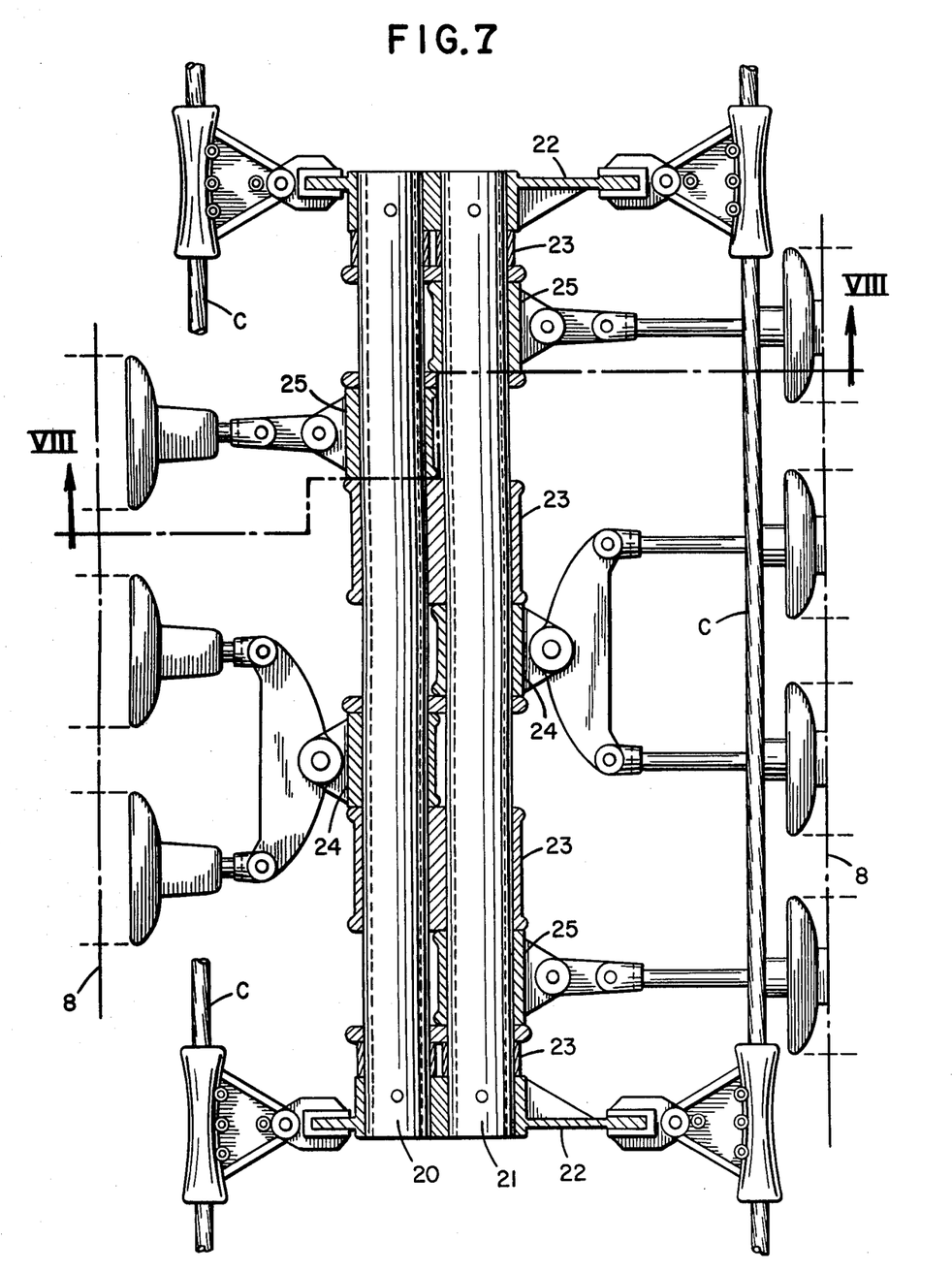
FIG. 7 is a view similar to that of FIG. 5, showing a support designed for a lateral position of the suspension catenary.
Figure 8:
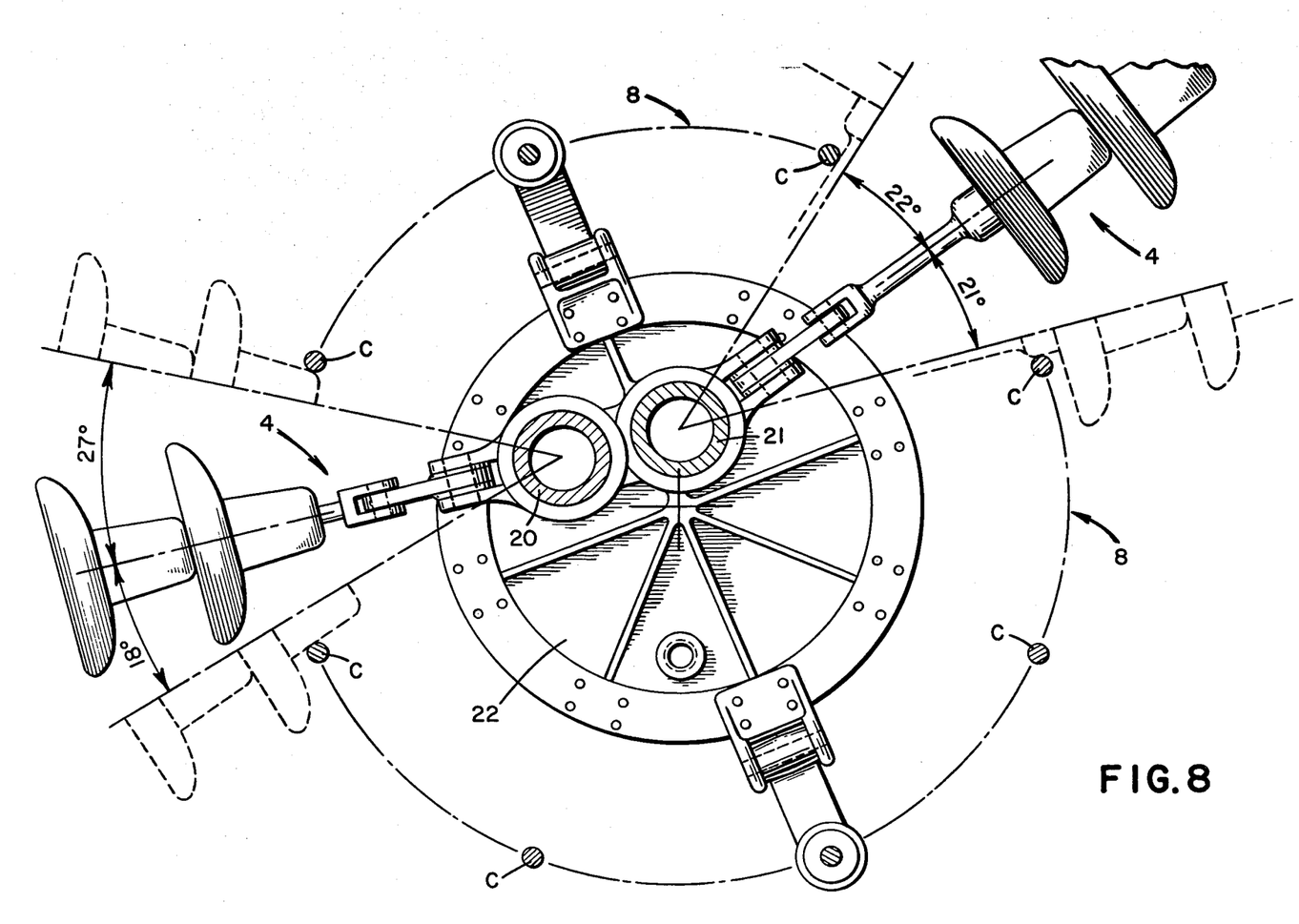
FIG. 8 is a section similar to that of FIG. 6, but along the line VIII—VIII of FIG. 7.

FIGS. 7 and 8 show a modified structure of the suspension support according to the invention, which differs from that shown in FIGS. 5 and 6 mainly because it is designed to support a bundle of conductors in a lateral position, instead of a central position.

For this purpose, as seen, the tubes 20 and 21 are considerably more elongated in order to allow the mounting, on the inner side (left of drawing), of the coupling sleeves 24 for the connection of three insulating catenaries, and the mounting, on the outer side (right of drawing), of coupling sleeves 25 for the connection of four catenaries, as well as the interposition of appropriate distance double-rings 23 acting also as connection rings of the two tubes.

FIG. 8 shows furthermore, in detail, the asymmetric positioning of the axes of the two tubes 20 and 21, in respect of the centre of the disc plate 22, i.e. in respect of the axis of the bundle. This arrangement is determined so as to obtain the utmost stability of the bundle of conductors, in response to the oscillations imparted by the wind, taking into account the vectors of the tractive forces exerted by the catenary 4.

Also in this arrangement, it can be observed that a wide range of oscillation amplitude is allowed for the bundle, indicated on the drawing as 18°+27° towards the centre (left of drawing), and as 21°+22° outwardly, i.e. towards the standards 1 (right of drawing).

As can be easily seen from the drawings, the suspension support according to the invention provides—between each sub-conductor of the bundle and the supporting insulating catenary—a double connection system, which notably increases the safety of the line, as compared to the supports of known technique.

It is anyhow understood that the invention is not limited to the particular embodiments shown in the drawings, but that various modifications may be provided, differing form the same, both for what concerns the basic structure of the suspension support, and for what concerns its adjustment to the various possible configurations of the standards supporting the line. In particular, the central core can easily be obtained with a solid bar of any section, or even with a plate, in replacement of the steel tube or tubes. All these modified embodiments should anyhow be considered within reach of a technician skilled in the art, and in any case falling within the protection scope of the present invention.

I claim:

1. System for the suspension of conductors in a bundle, in high and very high voltage electric lines, of the type wherein the line comprises, in correspondence of each suspension point, a pair of supporting struts connected to a suspension insulating catenary formed of tie rods and carrying, at predetermined mutual distances, supports for the suspension of conductors in a bundle, each support being connected to two oblique branches of the catenary, subjected to tensive forces in diverging directions, each suspension support being formed by a central elongated rigid core, having its axis parallel to the longitudinal axis of the bundle of conductors, onto which core there is fixed at least one set of radially positioned brackets, each for the support of a sub-conductor of the bundle, the tie rods forming said branches of the insulating catenary being furthermore directly anchored onto said core, so that said diverging directions of the tensive forces of the tie rods may pass through the axis of the central elongated rigid core.

2. Suspension system as in claim 1, including at least one disc plate keyed onto said central core and wherein said brackets supporting the sub-conductors are fixed at evenly distributed points along the periphery of said at least one disc plate.

3. Suspension system as in claim 2, including two disc plates keyed on the two opposite ends of said central core.

4. Suspension system as in claim 1, including a clamp holding each sub-conductor, each clamp being attached to a respective bracket by a pin perpendicular to the plane passing through the axis of the central core and through the axis of the sub-conductor to mount a sub-conductor on each bracket.

5. Suspension system as in claim 1, wherein said rigid central core is formed by at least one steel tube.

6. Suspension system as in claim 1, wherein said rigid central core is formed by a pair of parallel steel tubes, mutually connected by stiff double-rings distributed along the extension of said tubes.

7. Suspension system as in claim 1, wherein said rigid central core is formed by a plate.

8. Suspension system as in claim 1, including coupling sleeves mounted on the central core, said coupling sleeves being rotatable on said central core but fixed against sliding longitudinally on said core, and wherein each tie rod of the catenary is anchored to the central core through a respective said coupling sleeve.

9. Suspension system as in claim 8, including connecting rod units each having two pins and wherein each tie rod of the catenary is connected to the respective coupling sleeve by means of a respective said connecting rod unit, said two pins of which are positioned perpendicularly to the plane passing through the axis of the central core and through the axis of the tie rod.

10. Suspension system as in claim 9, wherein at least one of said connecting rod units has two ends and a center and is in the form of a rocking lever connected at the center to a said coupling sleeve and at the two ends to two symmetrical tie rods.

11. Suspension system as in claim 9, wherein each tie rod includes a connection bar and an insulator and wherein the portion of each catenary which is closer to the suspension support includes—starting from the central core—a said connecting rod unit and a said connection bar, both fully contained inside the bundle of conductors, as well as a said insulator just on the outside of said bundle.

12. Suspension system as in claim 1, wherein said rigid central core is formed by a bar.

* * * * *